A. H. NEULAND.
ELECTROMAGNETIC POWER TRANSMITTING AND CONVERTING APPARATUS.
APPLICATION FILED NOV. 7, 1914.
1,242,714. Patented Oct. 9, 1917.
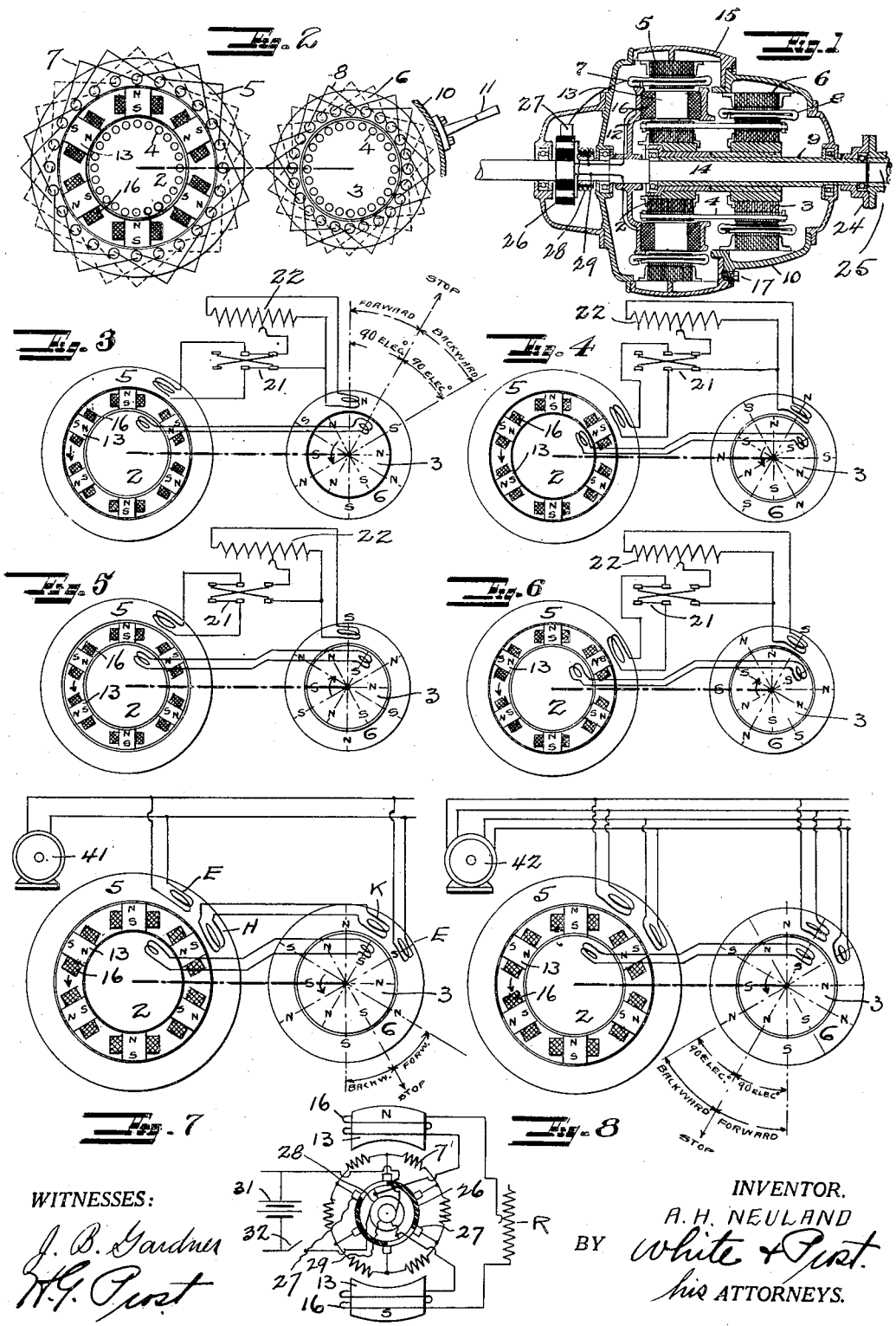
WITNESSES:
J. B. Gardner
H. G. Pirot
INVENTOR.
A. H. NEULAND
BY White & Pirot
his ATTORNEYS.

UNITED STATES PATENT OFFICE.

ALFONS H. NEULAND, OF SAN FRANCISCO, CALIFORNIA.

ELECTROMAGNETIC POWER TRANSMITTING AND CONVERTING APPARATUS.

1,242,714.     Specification of Letters Patent.     Patented Oct. 9, 1917.

Application filed November 7, 1914. Serial No. 870,785.

*To all whom it may concern:*

Be it known that I, ALFONS H. NEULAND, a subject of the Czar of Russia, and a resident of the city and county of San Francisco, State of California, have invented certain new and useful Electromagnetic Power Transmitting and Converting Apparatus, of which the following is a specification.

The invention relates to electro-magnetic power apparatus and is adapted to be embodied as a power transmitting device to transmit power from one shaft to another when mechanical power is supplied to one of said shafts, and as a variable speed variable torque, single or polyphase motor, utilizing alternating current.

In devices embodying my invention the current generated by the slip between a revolving field element, which is the driving member in embodiments as power transmissions, and a driven rotative armature member, is transferred to a consuming element operating on the induction motor principle, the rotor of which is operatively connected to the driven part of the generating element. Such devices are characterized by the fact that the driven member may rotate at a different angular velocity than the driving member, and also by the fact that the driven member is capable of speed variations relative to the driving member.

An object of my invention is to obtain a strong torque of the power or driven member at start and low speed. Another object is to obtain in power transmission devices a large torque reaction in the consuming element with a relatively small applied torque. Another object is to transfer the larger portion of the driver torque and power directly to the driven member, while at the same time obtaining a large torque reaction in the consuming element. Another object is to provide such a power transmission device in which the direction of rotation of the driven member may be easily reversed relative to the direction of rotation of the driving member. Other objects are simplicity and compactness of construction and arrangement of parts.

The invention possesses other advantageous features, some of which, with the foregoing, will be set forth at length in the following description, where I shall outline in full that form of the invention which I have selected for illustration in the drawings accompanying and forming part of the present specification. In the drawings I have shown only one specific form of my generic invention.

Referring to said drawings:

Figure 1 is a longitudinal section of one form of machine of my invention.

Fig. 2 is a diagrammatic representation of the electrical and magnetic structures of the machine.

Fig. 3 is a diagrammatic representation showing the positioning of the electric and magnetic structures when the driving and driven elements are rotating in the same direction and the power factor of the currents being high.

Fig. 4 is similar to Fig. 3 with the exception that the currents generated have a low power factor.

Fig. 5 is similar to Fig. 3 with the exception that the electric circuits are arranged to produce opposite directions of rotation of the driving and driven members.

Fig. 6 is similar to Fig. 4 with the same exception as in Fig. 5.

Fig. 7 is a diagrammatic representation of the arrangement of the electric circuits to produce a single phase motor.

Fig. 8 is a diagrammatic representation of the arrangement of the electric circuits to produce a polyphase motor.

Fig. 9 is a diagrammatic representation of the connections between an additional stator winding and a commutating device when the machine shown in Figs. 1 and 2 is to furnish its own exciting current, or is to be used as a starter for the prime mover.

In Figs. 3 to 8 inclusive only one coil of one of the phases has been shown, which coil is that part of one pole winding in which the current has maximum value. At that instant the multiplicity of lines which would obtain if all of the windings were shown would greatly impair the legibility of the diagrams, it being understood that a similar coil properly displaced will be provided for each of the other phases.

Broadly considered, the apparatus of my invention, when embodied as a power transmitting apparatus, consists in one of its forms of a unit embodying two magnetic structures, the first structure consisting of a stator and a rotor, separated by rotatable field poles, which poles constitute the driving element, and the second structure consisting of a stator and rotor in close inductive relation to each other. The two rotors are secured to a common shaft and constitute the driven element. The rotors are provided with interconnected windings so that the current may pass from one rotor winding to the other, and the stators are provided with interconnected windings, so that the current may pass from one stator winding to the other.

The laminated rotors 2—3 of the respective structures may be provided with a single squirrel cage winding, that is, one in which the bars 4 extend through both rotors and are connected only at their ends or with any other suitable polyphase windings for equal poles on both rotors. The laminated stators 5—6 or the respective structures are each provided with a polyphase winding 7—8 of an equal number of poles, the windings being electrically connected. The stators and rotors are axially alined and the rotors are secured to a common hollow shaft 9, which is provided with suitable bearings. Arranged between the stator 5 and the rotor 2 is a rotatable structure or spider 12 which carries the field poles 13. The spider 12 is secured to the shaft 14 which constitutes the driving shaft and which is suitably journaled in the frame 15. The field poles 13 are provided with energizing coils 16 supplied from a source of direct current. Any suitable means may be provided for connecting the driving shaft 14 to the prime mover. The structure which carries the field poles will hereinafter be termed the driver or driving element, and the rotors will be termed the driven element.

With the field poles 13 excited and the driver rotated and the driven shaft 9 locked against rotation, a polyphase current will be generated in the stator and rotor windings 7 and 4 of the first structure. Since the two stator windings are interconnected and the two rotor windings are interconnected, the generated polyphase currents in the windings of rotor 2 pass into the windings of rotor 3 and create therein a revolving field having an angular velocity equal to the angular velocity of the field in the first structure. Similarly, the generated polyphase currents in the windings 7 of the stator 5 of the first structure pass into the windings 8 of the stator 6 of the second structure and produce therein a revolving magnetic field of equal angular velocity which has the same direction of rotation as the field due to the rotor currents. The stator 6 is mounted in a rotatable portion 10 of the frame 15 so that it may be rotated through an arc corresponding to 180 electrical degrees, so that by shifting the stator 6 through this arc, the positions of the poles of the revolving field in the stator windings 8 may be shifted with relation to the poles of the revolving field of the rotor, to such an extent that the position of the poles of one polarity may be moved to that previously occupied by the poles of the opposite polarity. The frame portion 10 may be shifted by any suitable means, such as a handle 11, and may be locked in position by the set screw 17. In large machines other means may be employed for moving the stator.

In this manner two rotating fields are established in the second structure which exert a torque upon each other, and the direction of the torque is dependent upon the relative positions of the stator field with respect to the rotor field. If the stator 6 is shifted to one side, setting up stator north poles on one side of the rotor south poles, the torque is exerted in one direction, and if shifted to the other position, setting up stator north poles on the other side of the rotor south poles, the torque is exerted in the opposite direction. The magnitude of the torque, other conditions remaining the same, is dependent on the displacement of the stator poles with respect to the rotor poles; that is, the torque is dependent on how far the stator poles are shifted from the position where they coincide with the rotor poles of opposite polarity. When the poles of opposite polarity thus coincide, a common unidirectional magnetomotive force and flux is produced, developing a high counter electromotive force and limiting the current to a small value.

It is seen, therefore, that although there are two revolving fields, the torque produced by the stator on the rotor in either direction of rotation is similar to the effect which would be obtained with stationary poles, in so far as direction of rotation and magnitude of the torque are concerned.

So far I have considered the driving of the field poles 13 in one direction, thereby generating two polyphase currents which are caused to act upon one another in the second structure, thereby causing the stator 6 to exert a torque on the rotor 3 in either direction while the rotor remains stationary. I will now show that a torque in either direction upon the rotor or driven member may be maintained by the stator 6 at all possible speeds of the rotor.

When the driving poles 13 rotate in a counter-clockwise direction, as indicated in Fig. 3, and the rotor windings 4 are closed, the currents generated therein will produce a torque reaction between the field and rotor, causing the rotor to follow the field poles and rotate in a clockwise direction. When the stator 6 is shifted to a position such as will produce a positioning of the opposing poles of the revolving fields that will produce a torque upon the rotor in a clockwise direction, which torque adds itself to the torque existing between the rotor 2 and the revolving field, the rotors or the driven member will rotate. Since the rotor 2 follows the revolving field, the slip is decreased with a corresponding decrease in the frequency of the generated rotor currents, which causes a slowing up of the rotor field of the second structure. However, to the rotor field velocity is added the rotor velocity, and when the two rotations are combined a resultant rotor field velocity with respect to the stator is produced which has not changed and which has a velocity equal to the velocity of the stator field. Therefore, the relative angular displacement between the stator and rotor poles of the second structure does not, at any speed of the rotor, differ from that originally fixed by the shifting of the second stator 6. With the field element rotating at constant velocity, a constant frequency current is generated in the stator and with the rotor rotating at constant velocity, a constant frequency current of lower frequency is generated in the rotor and if the rotor speed varies, a varying frequency current is generated in the rotor. The change in frequency of the generated rotor current due to variable rotation of the rotor is compensated by the rotation of the rotor, thereby preserving a torque at varying speeds of the rotor.

As long as the stator and rotor windings are similar with regard to turns, the phase displacement of the current induced therein relative to the E. M. F. will be substantially the same and hence the electrical quadrature relation will be maintained, which means that the torque on the rotor of the second structure, for equal currents in the windings, will not be affected by the power factor thereof, so long as the phase displacement is the same in the stator and rotor windings, but the currents in both structures will be shifted an equal distance, when the phase displacement changes, but will retain their original relations. The change in phase displacement of the stator and rotor currents, will, however, in the first structure, be accompanied by a shifting of the stator and rotor currents with respect to the driving field poles 13.

In Fig 3 I have shown diagrammatically the conditions which obtain when the driving field poles and the rotors rotate in the same direction and the phase displacement of the currents is negligible. In this instance the current is substantially in phase with the E. M. F. and in quadrature with the field poles. The relation between the windings of the first and second structure is such that those windings which oppose each other in the first structure have quadrature relation in the second.

Instead of shifting the stator 6 to change the direction of rotation of the rotor 3, the relative polarity of the currents in the second structure may be otherwise reversed. For example I have shown in Fig. 3 a reversing switch 21 arranged in the circuit between the two stator windings, so that the polarity of the stator windings may be reversed, thereby producing a reverse direction of rotation of the driven element, it being understood that a similar switch is provided for each of the other phases of a polyphase winding. Fig. 4 illustrates a condition when the lag of the two currents is great, but the same. In other words, as indicated, the maximum current in both windings of the first structure lags and practically opposes the pole pieces; this is accompanied by a corresponding lag of the currents in the second structure, the relative angular displacement, however, has not changed. Fig. 5 is substantially the same as Fig. 3 and Fig. 6 is the same as Fig. 4 except that in Fig. 5 and Fig. 6 all the poles of the second stator have been reversed by means of the switch and the pull on the rotor of the second structure is in the opposite direction. The speed and torque of the driven element may be controlled in several ways. The voltage relation between the stator and rotor currents of one structure may be varied relative to that of the other structure for producing variations in speed and torque. The voltage relation may be varied by inserting an auto-transformer 22 in the circuit between the stator windings. Speed, torque and direction of rotation of the driven element may be also controlled by shifting the stator pole windings with respect to the rotor pole windings, from a position where they coincide, at which point the current will have a very small value on account of the strong counter electromotive force, to the right for rotation in one direction and to the left for rotation in the opposite direction. The shifting may be accomplished by shifting one of the stators with its windings, in which case the electrical connections between the two stators and the two rotors may be permanent or by making the stators immovable and changing the connections between either the two stator or the two rotor windings. The speed and torque of the driven element may also be varied by changing the strength of the driver field current by inserting a variable resistance R in the field current (see Fig. 9).

A large starting torque is obtained by making the windings of the second structure of negligible resistance or impedance, the turns of the stator and rotor windings being properly proportioned to effect this condition, whereby a very large current may be made to flow in the windings of the second structure with a relatively small field current in the exciting coils of the field poles. It is manifest that with this practically short-circuited condition of the stator and rotor windings, the field, when fully magnetized so as to exert its full torque of 100%, will generate large currents which will have a very low power factor, or in other words, currents of many times their normal value, that is, that value which a unity power factor current would have when producing 100% torque reaction. These currents acting on the stator and rotor of the second structure produce in the driven member a starting torque and accelerating torque at low speeds, which torques are many times that of the driver.

When the driven member rotates in the same direction as the driver the torque existing between the field and rotor of the first structure is added to that of the torque reaction of the second structure, while when the driven member rotates in the opposite direction to the driver the torque between the field and rotor of the first structure is subtracted from the torque reaction of the second structure. When the driven member is operating below synchronism the resistance or impedance of the rotor and stator windings may be so adjusted and the driver field current be so regulated that the current in the rotor of the first structure to have a high power factor and the current in the stator of the first structure to have a low power factor, and the stator of the second structure may be shifted to a position which produces electrical quadrature relation between the stator and rotor currents, regardless of the differing power factors. Under these conditions, the high power factor current in the rotor creates a large torque reaction and transfers a large portion of the power directly to the driven member, and the low power factor current of the stator requires but a small torque of the driver for its production. In this way the larger portion of the driver torque and power is directly transferred to the driven member, and the larger part of the power balance, represented by the slip, is converted into electrical energy of high power factor in the first rotor, which is conducted to the second rotor and there converted into an additional torque, thus leaving the stator windings of the first structure to supply a low power factor magnetizing current to the stator of the second structure.

The rotor shaft or sleeve 9 which is mounted for rotation on the driving shaft 14 is connected at its end by means of a coupling 24 to the solid driven shaft 25, which is connected to the mechanism to be driven. The driving shaft 14 projects from the machine so that it may be readily connected to the prime mover. The apparatus of my invention may be employed in a great variety of uses, where it is desirable to vary the speed of a driven element with respect to the speed of the prime mover. As an instance, it may be used in connection with steam turbines in marine work to step down the speed for the propeller shaft, and it may be used in automobiles for producing the desired change speed relation between the engine and the rear axle. These are merely instances showing the range of use and range of size of the apparatus. When it is desirable the field coils 16 may be connected through a commutator and brushes to the stator winding 7, or to a separate stator winding to generate the desired voltage, so that the exciting current may be drawn from the stator windings, making the apparatus self-exciting. In Fig. 9 I have shown diagrammatically the arrangement of the circuits whereby this is accomplished, the diagram illustrating a two pole machine having an independent stator exciting winding 7'. Secured to the shaft 14 is a commutator 26 which is engaged by brushes 27 connected to the stator windings. The commutator segments are connected to slip rings 28—29 mounted on the shaft 14, and the field coils 16 are connected to the commutator segments or to the slip rings. The alternating current from the stator winding is, therefore, converted into a direct current and conducted to the field windings. When the device is used in an automobile, it may also be employed as a motor for starting the engine and as a generator for storing the battery 31. The opposite sides of the battery are connected to brushes contacting with the slip rings and the battery circuit is provided with a switch 32. When the switch is closed, direct current is fed into the field coils and through the commutator and brushes to the stator windings, thereby causing the field poles to rotate and start the engine.

It has been pointed out hereinbefore that one of the important adaptations of this invention is as an alternating current single or polyphase motor having series motor characteristics, including a powerful starting torque. When used in connection with a source of single phase current 41, one phase winding E of each of the stators 5—6 is connected thereto. The other phase winding H of the first stator is connected to the other phase winding K of the second stator, if the stators are wound for two phases. The rotor windings are interconnected as in the other constructions. In the polyphase construction indicated in Fig. 8, the phase windings of both stators are supplied with current from the source of alternating current 42, and the rotor windings are interconnected as before.

When the motor is to be used, the member carrying the energized field poles of the first structure is started from rest and brought up to speed by any suitable means and is synchronized with the alternating current in the stator. It then receives its power from the electrical source, instead of being rotated by the prime mover. The second stator of the construction shown in Fig. 7 then receives its energizing current for one phase from the single phase supply and the second phase receives it from the first stator. In other respects the apparatus operates the same as before and its speed, torque and direction of rotation may be controlled in substantially the same manner as when the apparatus is employed as a power transmission device.

It is obvious that a machine may be adapted for use in both capacities, that is, as a power transmission device and as a motor, or may be constructed and adapted for only one of these uses.

I claim—

1. A dynamo-electric machine comprising a stator member having two stator elements, electrically connected windings therefor, a driven rotor member having two mechanically connected rotor elements, electrically connected windings therefor arranged in inductive relation to the windings of the second stator element, a rotative field member inductively related to the windings of the first rotor and stator elements, a commutator rotative with the field member and electrically connected to the coils thereof, and brushes wiping the commutator and connected to the stator windings of the first stator element.

2. A dynamo-electric machine comprising a stator member having two stator elements, electrically connected windings therefor, a driven rotor member having two mechanically connected rotor elements, electrically connected windings therefor arranged in inductive relation to the windings of the second stator element, a rotative field member inductively related to the windings of the first rotor and stator elements, a commutator rotative with the field member and electrically connected to the coils thereof, brushes wiping the commutator and connected to the stator windings of the first stator element, slip rings rotative with and electrically connected to the commutator, a storage battery, and brushes wiping the slip rings and arranged to be connected to the storage battery.

3. A dynamo-electric machine comprising a stator member having two stator elements, electrically connected windings therefor, a driven rotor member having two mechanically connected rotor elements, electrically connected windings therefor arranged in inductive relation to the windings of the second stator element, a rotative field member inductively related to the windings of the first rotor and stator elements, and means for reversing the connections between the windings of the elements of one member.

4. A dynamo-electric machine comprising a stator member having two stator elements, electrically connected windings therefor, a driven rotor member having two mechanically connected rotor elements, electrically connected windings therefor arranged in inductive relation to the windings of the second stator element, a rotative field member inductively related to the windings of the first rotor and stator elements, and means for reversing the connections between the windings of the two stator elements.

5. A dynamo-electric machine comprising a stator member having two stator elements, electrically connected windings therefor, a driven rotor member having two mechanically connected rotor elements arranged concentrically of and in the same transverse plane with the respective stator elements, electrically connected windings therefor, the second rotor and stator elements being arranged with their windings in close relation, a rotative driver arranged between the first rotor and stator elements and including means for producing a magnetic field acting on both windings, and means for reversing the connections between the windings of the elements of one member.

6. A dynamo-electric machine comprising a stator member having two stator elements, electrically connected windings for the two stator elements, a driven rotor member having two mechanically connected rotor elements arranged concentrically of the stator elements, a squirrel-cage winding connecting the two rotor elements, the second rotor and stator elements being arranged with their windings in close relation, a rotative driver arranged between the first rotor and stator elements and including means for producing a magnetic field acting on both windings, and means for reversing the connections between the windings of the two stator elements.

7. A dynamo-electric machine comprising a stator member having two stator elements, electrically connected windings for the two stator elements, a driven rotor member having two mechanically connected rotor elements arranged concentrically of the stator elements, a squirrel-cage winding connecting the two rotor elements, the second rotor and stator elements being arranged with their windings in close relation, a rotative driver arranged between the first rotor and stator elements and including means for producing a magnetic field acting on both windings, means for reversing the connections between the windings of the two stator elements, and means for angularly shifting the second stator element relative to the coöperating rotor element to vary their polar relation.

8. A dynamo-electric machine comprising a stator member having two stator elements and windings therefor, a rotor member having two mechanically connected rotor elements arranged concentrically of and in the same transverse plane with the respective stator elements, windings for the rotor elements, the second rotor and stator elements being arranged with their windings in close relation, a rotative field member arranged between the first rotor and stator elements and in inductive relation to the windings thereof, a commutator rotative with the field member and electrically connected to the coils thereof, and brushes wiping the commutator and connected to the stator winding of the first stator element.

9. A dynamo-electric machine comprising a stator member having two stator elements and windings therefor, a rotor member having two mechanically connected rotor elements arranged concentrically of and in the same transverse plane with the respective stator elements, windings for the rotor elements, the second rotor and stator elements being arranged with their windings in close relation, a rotative field member arranged between the first rotor and stator elements and in inductive relation to the windings thereof, a commutator rotative with the field member and electrically connected to the coils thereof, brushes wiping the commutator and connected to the stator winding of the first stator element, slip rings rotative with and electrically connected to the commutator, a storage battery, and brushes wiping the slip rings and arranged to be connected to the storage battery.

10. A dynamo-electric machine comprising a stator member having two stator elements, electrically connected windings therefor, a source of alternating current for the stator winding, a rotor member having two mechanically connected rotor elements, electrically connected windings therefor arranged in inductive relation to the windings of the second stator element, a rotative field member inductively related to the windings of the first rotor and stator element, and means for reversing the connections between the windings of the elements of one member.

In testimony whereof, I have hereunto set my hand at San Francisco, California, this 2nd day of November 1914.

ALFONS H. NEULAND.

In presence of—
  H. G. PROST,
  J. B. GARDNER.